United States Patent [19]
Sato et al.

[11] Patent Number: 6,122,118
[45] Date of Patent: Sep. 19, 2000

[54] MAGNETIC REPRODUCING APPARATUS WITH PARTIAL RESPONSE DECODER INCLUDING VITERBI ALGORITHM AND THE LEAST SQUARE METHOD

[75] Inventors: Teruo Sato, Kanagawa; Yasuo Tonami, Tokyo, both of Japan

[73] Assignee: Sony Corporation, Tokyo, Japan

[21] Appl. No.: 08/278,864

[22] Filed: Jul. 22, 1994

[30] Foreign Application Priority Data

Jul. 29, 1993 [JP] Japan .............................. P05-188393

[51] Int. Cl.$^7$ ...................................................... G11B 5/09
[52] U.S. Cl. .............................................. 360/46; 360/51
[58] Field of Search ................... 360/51, 48, 46; 375/262, 263

[56] References Cited

U.S. PATENT DOCUMENTS

| | | | |
|---|---|---|---|
| 5,303,263 | 4/1994 | Shoji et al. ................................ | 375/11 |
| 5,323,422 | 6/1994 | Ushirokawa ............................... | 375/12 |
| 5,341,249 | 8/1994 | Abott et al. ................................ | 360/46 |
| 5,357,524 | 10/1994 | Shimpuku et al. ........................ | 371/30 |

OTHER PUBLICATIONS

R.D. Cideciyan et al.; "A PRML System for Digital Magnetic Recording" IEEE Journal on Selected Areas in Communications; vo. 10, No. 1, Jan. 1, 1992; p.38–56, XP000457625.

J.G. Proakis; Digital Communications, $2^{nd}$ Edition, 1989 McGraw–Hill, NY XP002053620, p. 624 and 627.

W.H. Press et al.; "Numerical Recipes; The Art of Scientific Computing" 1986, Cambridge University Press, Cambridge XP002053621 P. 31 and 38.

*Primary Examiner*—Paul Loomis
*Assistant Examiner*—Regina Y. Neal
*Attorney, Agent, or Firm*—Ronald P. Kananen; Rader, Fishman & Grauer

[57] ABSTRACT

A magnetic reproducing apparatus plays back a magnetic recording medium on which digital data have been magnetically recorded through a partial response encoder. The magnetic reproducing apparatus includes a synchronizing signal data detector for detecting a synchronizing signal data part from a reproduced signal data series, a transmission path characteristics estimator for modeling an impulse response between a recording system and a reproducing system with the synchronizing signal data part detected by the synchronizing signal data detector being used as a reference signal, and a decoder for decoding a recorded signal data series according to a Viterbi algorithm based on a transmission model produced by the transmission path characteristics estimator.

10 Claims, 11 Drawing Sheets

FIG. 5

| Time Base | Channel Response (hi) | Sync Pattern (xi) | Reproduced Signal (yi) | Mutual Correlation (xi, yi) | Self Correlation (xi) |
|---|---|---|---|---|---|
| -15 |  | 1.00000 | 1.00000 | 0.06173 | 0.25000 |
| -14 |  | 1.00000 | 0.40000 | 0.13580 | 0.31250 |
| -13 |  | 1.00000 | 0.10000 | 0.17284 | 0.37500 |
| -12 |  | 1.00000 | 0.0 | -0.06173 | 0.31250 |
| -11 |  | 1.00000 | 0.0 | 0.08542 | 0.37500 |
| -10 |  | 0 | -1.00000 | 0.03704 | 0.37500 |
| -9 |  | 0 | -0.40000 | 0.01235 | 0.37500 |
| -8 |  | 0 | -0.10000 | 0.0 | 0.37500 |
| -7 |  | 1.00000 | 1.00000 | -0.12346 | 0.31250 |
| -6 |  | 1.00000 | 0.40000 | -0.04938 | 0.31250 |
| -5 |  | 0 | -0.90000 | 0.11111 | 0.37500 |
| -4 |  | 1.00000 | 0.60000 | 0.04938 | 0.37500 |
| -3 |  | 1.00000 | 0.30000 | 0.13580 | 0.43750 |
| -2 |  | 1.00000 | 0.10000 | 0.17284 | 0.50000 |
| -1 |  | 0 | -1.00000 | 0.06173 | 0.50000 |
| 0 | 1.00000 | 1.00000 | 0.60000 | 1.00000 | 1.00000 |
| 1 | -0.60000 | 0 | -0.70000 | -0.59259 | 0.50000 |
| 2 | -0.30000 | 1.00000 | 0.70000 | -0.29630 | 0.50000 |
| 3 | -0.10000 | 0 | -0.70000 | -0.22222 | 0.43750 |
| 4 |  | 0 | -0.30000 | -0.17284 | 0.37500 |
| 5 |  | 0 | -0.10000 | -0.06173 | 0.37500 |
| 6 | 0 | 0 | 0.0 | -0.13580 | 0.31250 |
| 7 |  | 1.00000 | 1.00000 | -0.04938 | 0.31250 |
| 8 |  | 0 | -0.60000 | 0.11111 | 0.37500 |
| 9 |  | 0 | -0.30000 | 0.04938 | 0.37500 |
| 10 |  | 1.00000 | 0.90000 | 0.01235 | 0.37500 |
| 11 |  | 0 | -0.60000 | 0.0 | 0.37500 |
| 12 |  | 1.00000 | 0.70000 | -0.12346 | 0.31250 |
| 13 |  | 1.00000 | 0.30000 | 0.07407 | 0.37500 |
| 14 |  | 0 | -0.90000 | -0.08642 | 0.31250 |
| 15 |  | 0 | -0.40000 | -0.16049 | 0.25000 |
| 16 |  |  | -0.10000 | -0.06173 | 0.25000 |

FIG. 6

| Time Base | Channel Response |
|---|---|
| -1 | |
| 0 | 1.00000 |
| 1 | -1.00000 |
| 2 | |

FIG. 7

| Time Base | Channel Response | Σ 5 | Σ 11 | Σ 21 |
|---|---|---|---|---|
| 1 0 1 2 3 4 | -1.00000 -0.60000 -0.30000 -0.10000 | 1.0000 -0.6000 -0.3000 -0.1000 | 1.0000 -0.6000 -0.3000 -0.1000 | 1.0000 -0.6000 -0.3000 -0.1000 |

FIG. 8

| Σ | Coefficient Matrix (MPY) | Vec on Right-Hand Side (MPY) | L,U Resolution (MPY) (DIV) | | Forward and Backward Substitution (MPY) (DIV) | |
|---|---|---|---|---|---|---|
| 5 | 50 | 20 | 14 | 6 | 12 | 4 |
| 11 | 110 | 44 | 14 | 6 | 12 | 4 |
| 21 | 210 | 64 | 14 | 6 | 12 | 4 |

MAGNETIC REPRODUCING APPARATUS WITH PARTIAL RESPONSE DECODER INCLUDING VITERBI ALGORITHM AND THE LEAST SQUARE METHOD

BACKGROUND OF THE INVENTION

1. Field of the Invention

The present invention relates to a magnetic reproducing apparatus suitable with a partial response decoder for playing back a magnetic recording medium on which digital data have been magnetically recorded through a partial response encoder.

2. Description of the Related Art

Systems for magnetically recording and reproducing digital data are generally of the partial response arrangement in which digital data are recorded on a magnetic recording medium through a partial response encoder with a view to increasing the recording density or statistically eliminating DC components by effecting spectral shaping on a recording system, and digital data are obtained from a signal reproduced from the magnetic recording medium through a partial response decoder.

The partial response scheme allows digital data to be recorded and reproduced-highly efficiently under ideal transmission conditions. However, if the frequency band of recording and reproducing systems is insufficient or the overall frequency characteristics suffer deteriorations though the frequency band itself is sufficient, then the partial response design is subject to intersymbol interferences, resulting in a large increase in the error rate.

OBJECTS AND SUMMARY OF THE INVENTION

It is therefore an object of the present invention to provide a magnetic reproducing apparatus for accurately reproducing digital data from a magnetic recording medium on which such digital data have been magnetically recorded through a partial response encoder.

According to the present invention, there is provided a magnetic reproducing apparatus for playing back a magnetic recording medium on which digital data have been magnetically recorded through a partial response encoder, comprising synchronizing signal data detecting means for detecting a synchronizing signal data part from a reproduced signal data series, transmission path characteristics estimating means for modeling an impulse response between a recording system and a reproducing system with the synchronizing signal data part detected by the synchronizing signal data detecting means being used as a reference signal, and decoding means for decoding a recorded signal data series according to a Viterbi algorithm based on a transmission model produced by the transmission path characteristics estimating means.

The transmission path characteristics estimating means may comprise means for modeling the impulse response between the recording system and the reproducing system using the method of least squares with the synchronizing signal data part used as the reference signal, and a ROM for storing coefficient matrices to be used in the method of least squares. Data stored in the ROM stores may be values produced when the coefficient matrices are subjected to L.U resolution, or inverse matrices of the coefficient matrices.

To play back the magnetic recording medium on which digital data have been recorded through the partial response encoder, the Viterbi equalizer is used as the partial response decoder, and the recorded signal data are decoded based on the maximum-likelihood series estimation. Therefore, the digital data can be reproduced well.

Since the impulse response between the recording and reproducing systems is modeled using the method of least squares with the detected synchronizing signal pattern part serving as a reference signal, the impulse response between the recording and reproducing systems can uniquely be modeled. The model thus determined suffers a minimum error in the sense of estimation based on the method of least squares, resulting in good equalizing characteristics. The ROM stores coefficient matrices which have been calculated in advance. When the transmission path characteristic estimating means effects calculations using the method of least squares, it uses a coefficient matrix which is stored in the ROM. Consequently, the number of calculating steps may be reduced, resulting in operation at a higher speed.

The above and other objects, features, and advantages of the present invention will become apparent from the following description of an illustrative embodiment thereof to be read in conjunction with the accompanying drawings, in which like reference numerals represent the same or similar objects.

BRIEF DESCRIPTION OF THE DRAWINGS

FIG. 5 is a diagram showing channel responses, SYNC patterns, and other data;

FIG. 6 is a diagram showing channel responses;

FIG. 7 is a diagram showing channel responses with different parameters;

FIG. 8 is a diagram showing the numbers of calculations with different parameters;

DETAILED DESCRIPTION OF THE PREFERRED EMBODIMENT

Figure 1:
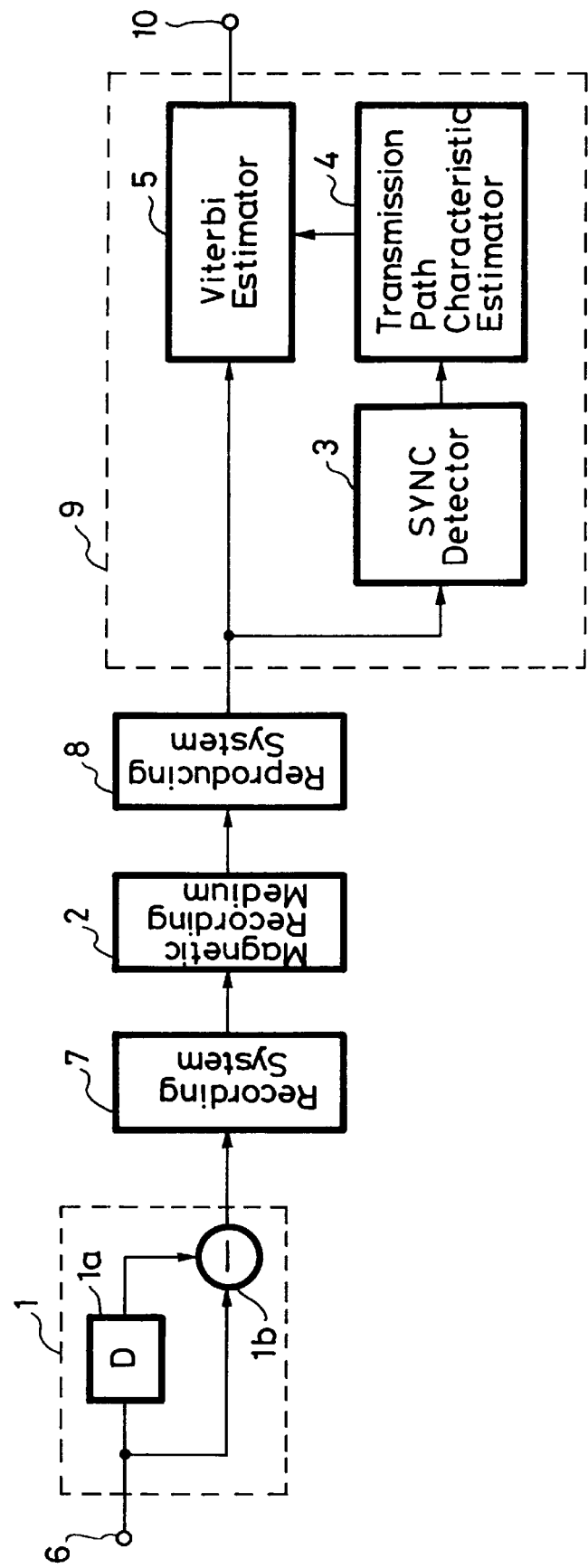
FIG. 1 is a block diagram of a magnetic reproducing apparatus for reproducing digital data according to the present invention.

A magnetic reproducing apparatus for reproducing digital data according to the present invention will be described below with reference to FIG. 1.

A digital data input terminal 6 is supplied with digital data which are to be recorded. Digital data to be recorded are supplied through the digital data input terminal 6 to a delay element 1a of a partial response encoder 1, and the digital data delayed by the delay element 1a are supplied to an input terminal of a subtractor 1b of the partial response encoder 1. The digital data supplied from the digital data input terminal 6 are also supplied to the other input terminal of the subtractor 1b.

The partial response encoder 1 is of the (1, −1) type represented by the following equation (1) or the bipolar code type:

$$R(D) = 1 - D \quad (1)$$

where D is the delay element.

Stated otherwise, the partial response encoder 1 may be regarded as a convolutional encoder having the following constraint length and rate:

Constraint length k=2, and
Rate r=1/1.

Figure 3:
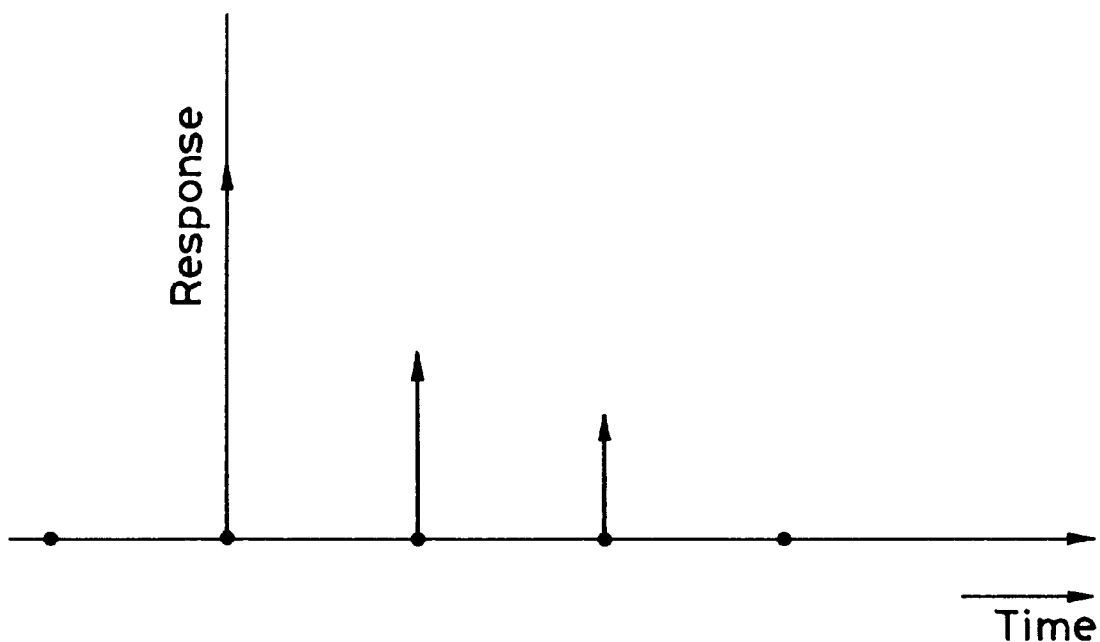
FIG. 3 is a diagram showing an impulse response model of recording and reproducing systems.

Therefore, the data can be decoded with a low error rate using the Viterbi algorithm. In a system for magnetically recording and reproducing digital data with a high density at a high speed, various deteriorating factors cannot be ignored which include recording and reproducing characteristics of magnetic heads, equalizer characteristics, and amplifying circuit characteristics. General transmission characteristics taking these deteriorating factors into account may be expressed in an FIR representation according to the following equation (2) in conformity with the equation (1) as shown in FIG. 3:

$$T(D) = 1 + a \cdot D + b \cdot D^2 \quad (2).$$

The second and third terms of the equation (2) represent deteriorating factors which are responsible for the generation of intersymbol interferences.

General characteristics taking into account the transmission characteristics of an encoder for partial response transmission and a recording and reproducing system are expressed by the following equation:

$$\begin{aligned} H(D) &= R(D) \cdot T(D) \quad (3)\\ &= (1-D)(1 + a \cdot D + b \cdot D^2)\\ &= 1 + h_{+1} \cdot D + h_{+2} \cdot D^2 + h_{+3} \cdot D^3 \end{aligned}$$

where $h_{+1}$, $h_{+2}$, $h_{+3}$ are coefficients given as follows:
$h_{+1} = a - 1$,
$h_{+2} = b - 1$, and
$h_{+3} = -b$.

Figures 4A, 4B, 4C:
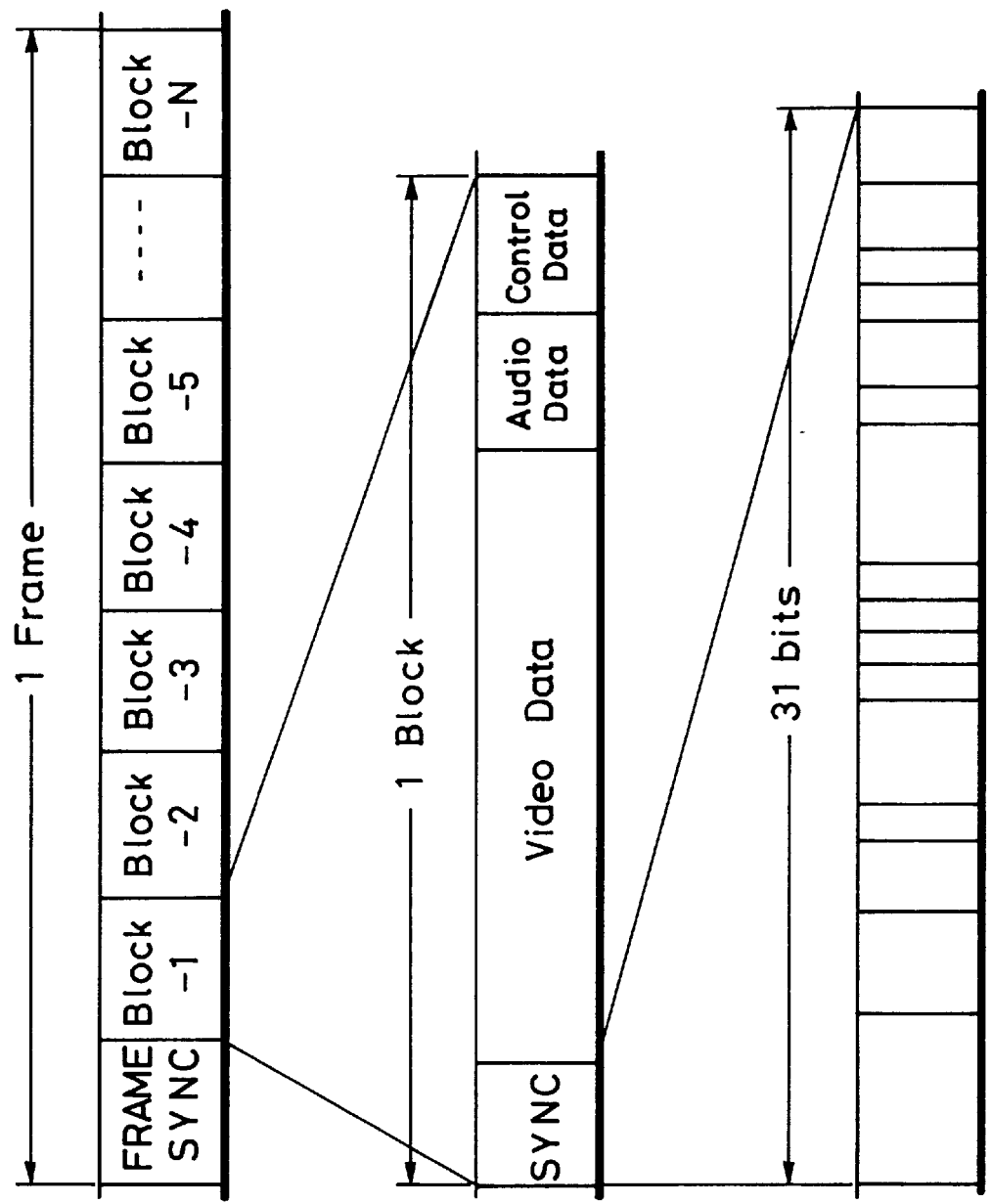
FIGS. 4A through 4C are diagrams showing a recording format for digital data.

Digital data in a magnetic recording and reproducing system are generally of a recording format having a frame structure as shown in FIG. 4A. As shown in FIG. 4A, each frame comprises a plurality of data blocks each including synchronizing signal data (see FIG. 4B) as its first data which have a known pattern. The synchronizing signal data may, for example, be one of M-series signals having a series length=31, as shown in FIG. 4C.

As shown in FIG. 1, an output signal from the partial response encoder 1 is recorded on a magnetic recording medium 2 such as a magnetic tape by a magnetic recording system 7.

The magnetic recording medium 2 is played back by a reproducing system 8, and a reproduced signal from the reproducing system 8 is supplied through a partial response decoder 9 to a digital data output terminal 10.

Figure 2:
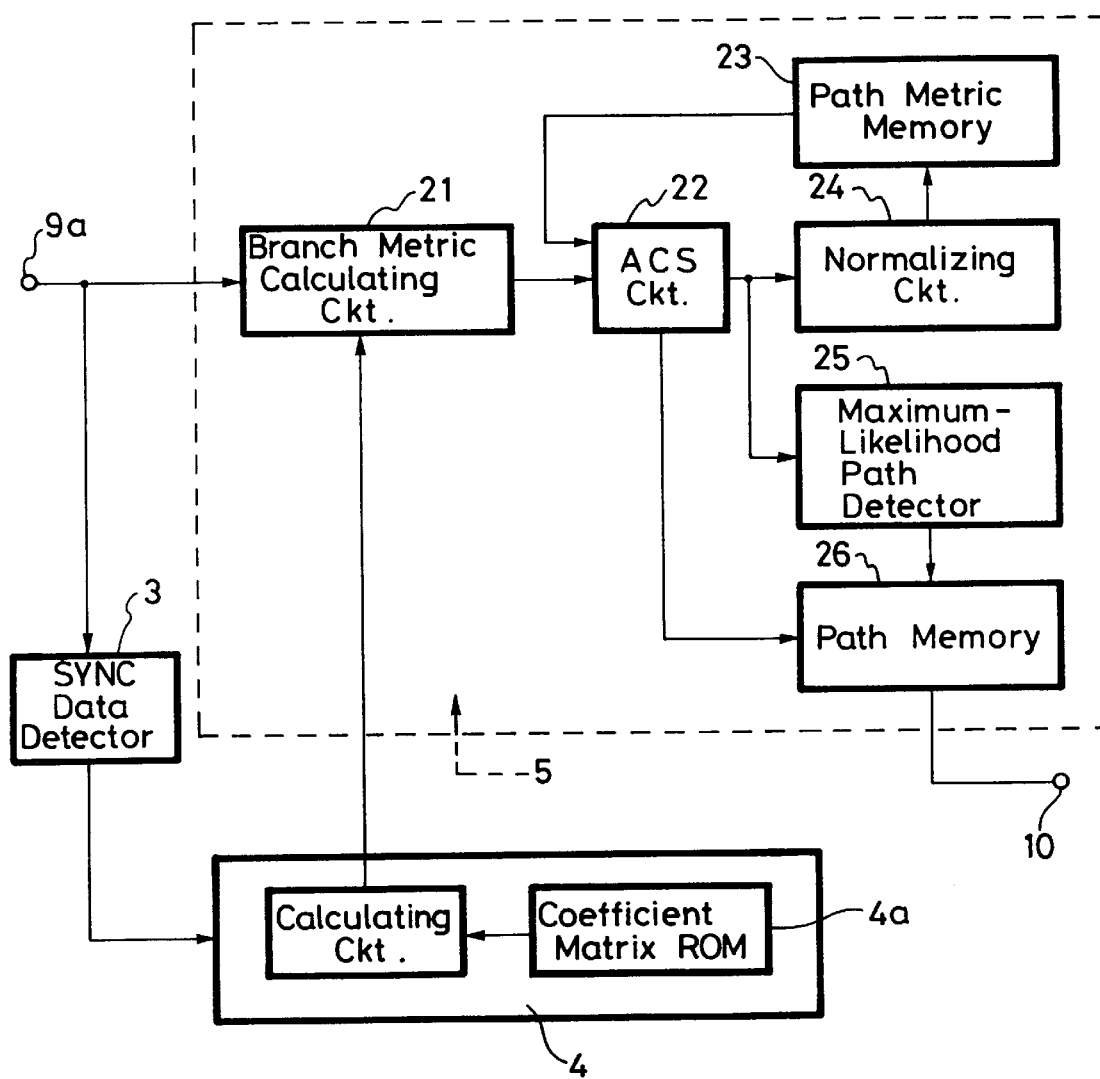
FIG. 2 is a block diagram of a Viterbi equalizer in the magnetic reproducing apparatus shown in FIG. 1.

According to the present invention, the partial response decoder 9 comprises a Viterbi equalizer 9 as shown in FIG. 2.

In FIG. 2, the Viterbi equalizer 9 has an input terminal 9a which is supplied with a reproduced signal. The supplied reproduced signal is supplied to a branch metric calculating circuit 21 and a synchronizing signal data detector 3. The synchronizing signal data detector 3 detects synchronizing signal data which are supplied to a transmission path characteristic estimator 4.

The pattern of the synchronizing signal data (SYNC pattern) is known as shown in FIG. 4C, for example. Therefore, the transmission path characteristic estimator 4 estimates impulse responses, hereinafter referred to as "channel responses", between the recording system 7 and the reproducing system 8 using the synchronizing signal data.

An example in which the channel responses are indicated as shown in FIG. 5 will be discussed below where the channel responses are actually unknown. In this example, the parameters a, b in the equation (2) which represent deteriorating factors are given as follows:

a=0.4000, and
b=0.1000.

The partial responses of an ideal (1, −1) partial response transmission system where the deteriorating factors of the recording and reproducing systems are negligible are as shown in FIG. 6. In FIGS. 5 and 6, the unit of a time base is equal to the interval at which symbols are transmitted. The synchronizing signal (SYNC) pattern shown in FIG. 5 is the same as the synchronizing signal pattern shown in FIG. 4C.

Synchronizing signal data which are reproduced when digital data are transmitted through a transmission system having such channel responses are expressed by the following equation:

$$y_i = \sum_{n=-km}^{+kp} h_n \cdot x_{i-n} \quad (4)$$

where $x_i$ represents the synchronizing signal pattern and $h_i$ the channel responses, each being of a value sampled at symbol time intervals.

When reproduced signals corresponding to the synchronizing signal data part are calculated according to the equation (4), output signals as shown in the column "reproduced signal (y)" in FIG. 5 are obtained. The known information in the reproducing system includes the synchronizing signal pattern $x_i$ and the reproduced signal $y_i$.

In this example, the transmission path characteristic estimator 4 is arranged as described below. The channel responses are modeled as shown in FIG. 7. With the channel responses thus modeled, the signal $y_i$ which is expected to be reproduced is expressed by the equation (4) above.

If an actually reproduced signal is represented by $Y_i$, then an error $E_i$ relative to an ith symbol is expressed as follows:

$$E_i = y_i - Y_i \quad (5).$$

Then, the square sum E of these errors is determined as follows:

$$E = \sum_{i=-l}^{+m} \varepsilon_i^2 \qquad (6)$$

$$= \sum_{i=-l}^{+m} \left\{ \sum_{n=-km}^{+kp} h_n \cdot x_{i-n} - Y_i \right\}^2.$$

The impulse series $h_n$ is determined such that the error E will be minimum. In this example, the method of least squares is applied. To this end, the equation (6) is partially differentiated with respect to $h_n$ as follows:

$$\frac{\partial E}{\partial h_n} = 2 \sum_{i=-l}^{+m} \left\{ \sum_{n=-km}^{+kp} h_n \cdot x_{i-n} - Y_i \right\} x_{i-n} \qquad (7)$$

$$= 0.$$

When n=−km, −(km −1), ..., 0, ..., +(kp−1),+$k_p$ is substituted in the equation (7), the following simultaneous equations are obtained:

$$\begin{bmatrix} \sum_{i=-l}^{+m} x_i^2{}_{+km} & \sum_{i=-l}^{+m} x_{i+km}x_{i+km-1} & \cdots & \sum_{i=-l}^{+m} x_{i+km}x_{i-kp} \\ \sum_{i=-l}^{+m} x_{i+km-1}x_{i+km} & \sum_{i=-l}^{+m} x_i^2{}_{+km-1} & & \sum_{i=-l}^{+m} x_{i+km-1}x_{i-kp} \\ \cdots & \cdots & & \cdots \\ \sum_{i=-l}^{+m} x_{i-kp}x_{i+km} & \sum_{i=-l}^{+m} x_{i-kp}x_{i+km-1} & & \sum_{i=-l}^{+m} x_i^2{}_{-kp} \end{bmatrix} \begin{bmatrix} h_{-km} \\ h_{-km+1} \\ \cdots \\ h_{+kp} \end{bmatrix} = \begin{bmatrix} \sum_{i=-l}^{+m} x_{i+km}Y_i \\ \sum_{i=-l}^{+m} x_{i+km-1}Y_i \\ \cdots \\ \sum_{i=-l}^{+m} x_{i-kp}Y_i \end{bmatrix}. \qquad (8)$$

When the parameters are set to (1+m)=11, km=0, kp=3, and the channel response length is set to 4 in the above equation (8), the following simultaneous equations are obtained:

$$\begin{bmatrix} 5.0 & 2.0 & 4.0 & 3.0 \\ 2.0 & 6.0 & 3.0 & 4.0 \\ 4.0 & 3.0 & 7.0 & 3.0 \\ 3.0 & 4.0 & 3.0 & 7.0 \end{bmatrix} \begin{bmatrix} h_0 \\ h_{+1} \\ h_{+2} \\ h_{+3} \end{bmatrix} = \begin{bmatrix} +2.300 \\ -2.900 \\ -0.200 \\ -1.000 \end{bmatrix}. \qquad (9)$$

Calculated results obtained when the channel responses are modeled with the parameter set to (1+m)=5, (1+m)=11, (1+m)=21 are shown in FIG. 7, and the numbers of calculations are shown in FIG. 8.

The calculated results shown in FIG. 7 indicate that the channel responses can be identified highly accurately when the parameters set to (1+m)=5, (1+m)=11, (1+m)=21 as is apparent from a comparison with the channel responses (hi) shown in FIG. 5.

As shown in FIG. 8, when the parameter is set to (1+m)=5, the number of multiplications (MPY) of a coefficient matrix is 50, the number of multiplications (MPY) of Vec on the right-hand side is 20, the number of multiplications (MPY) of L.U resolution is 14, the number of divisions (DIV) is 6, the number of multiplications (MPY) of forward and backward substitution is 12, and the number of divisions (DIV) is 4. When the parameter is set to (1+m)=11, the number of multiplications (MPY) of a coefficient matrix is 110, the number of multiplications (MPY) of Vec on the right-hand side is 44, the number of multiplications (MPY) of L.U resolution is 14, the number of divisions (DIV) is 6, the number of multiplications (MPY) of forward and backward substitution is 12, and the number of divisions (DIV) is 4. When the parameter is set to (1+m)=21, the number of multiplications (MPY) of a coefficient matrix is 210, the number of multiplications (MPY) of Vec on the right-hand side is 64, the number of multiplications (MPY) of L.U resolution is 14, the number of divisions (DIV) is 6, the number of multiplications (MPY) of forward and backward substitution is 12, and the number of divisions (DIV) is 4.

As can be seen from FIG. 8, the number of multiplications in the process of coefficient matrices and the L.U resolution is dominant in the number of calculations.

In this example, the transmission path characteristic estimator 4 calculates a coefficient matrix according to the following equation (10), as with the equation (9), for example:

$$\begin{bmatrix} \sum_{i=-l}^{+m} x_i^2{}_{+km} & \sum_{i=-l}^{+m} x_{i+km}x_{i+km-1} & \cdots & \sum_{i=-l}^{+m} x_{i+km}x_{i-kp} \\ \sum_{i=-l}^{+m} x_{i+km-1}x_{i+km} & \sum_{i=-l}^{+m} x_i^2{}_{+km-1} & & \sum_{i=-l}^{+m} x_{i+km-1}x_{i-kp} \\ \cdots & \cdots & & \cdots \\ \sum_{i=-l}^{+m} x_{i-kp}x_{i+km} & \sum_{i=-l}^{+m} x_{i-kp}x_{i+km-1} & & \sum_{i=-l}^{+m} x_i^2{}_{-kp} \end{bmatrix}. \qquad (10)$$

Then, the calculated coefficient matrix is stored in a ROM 4a. When the characteristic estimator 4 calculates the equation (8), it employs the coefficient matrix which is stored in the ROM 4a.

The coefficient matrix according to the equation (10) is uniquely determined irrespective of the transmission path characteristics once the channel response length to be modeled and the parameters of the equation (8) are given.

As many coefficient matrices as can be expected are calculated in advance and stored as a table in the ROM 4a. To store such a coefficient matrix in the ROM 4a, a synchronizing signal pattern is first identified, then a coefficient matrix is calculated, and thereafter the calculated coefficient matrix is stored as a table in the ROM 4a.

After the channel responses have been identified, the recorded data series is decoded using the Viterbi algorithm.

Figure 9:
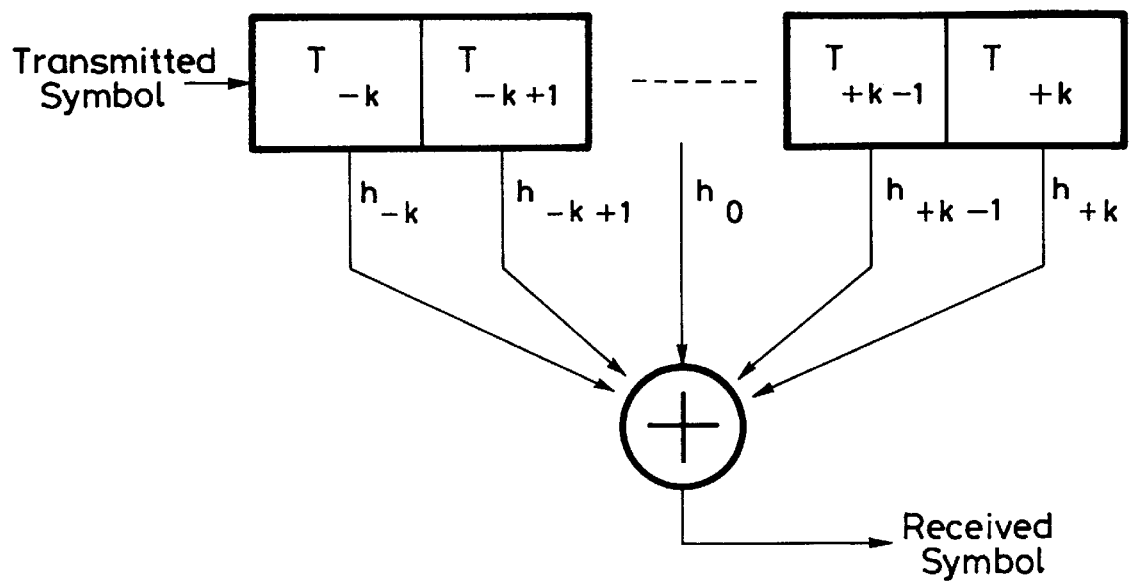
FIG. 9 is a diagram of a general transmission path equivalent model.

An example shown in FIG. 10, which is modeled after a general model illustrated in FIG. 9, with its channel response length specifically limited will be described below.

Figure 10:
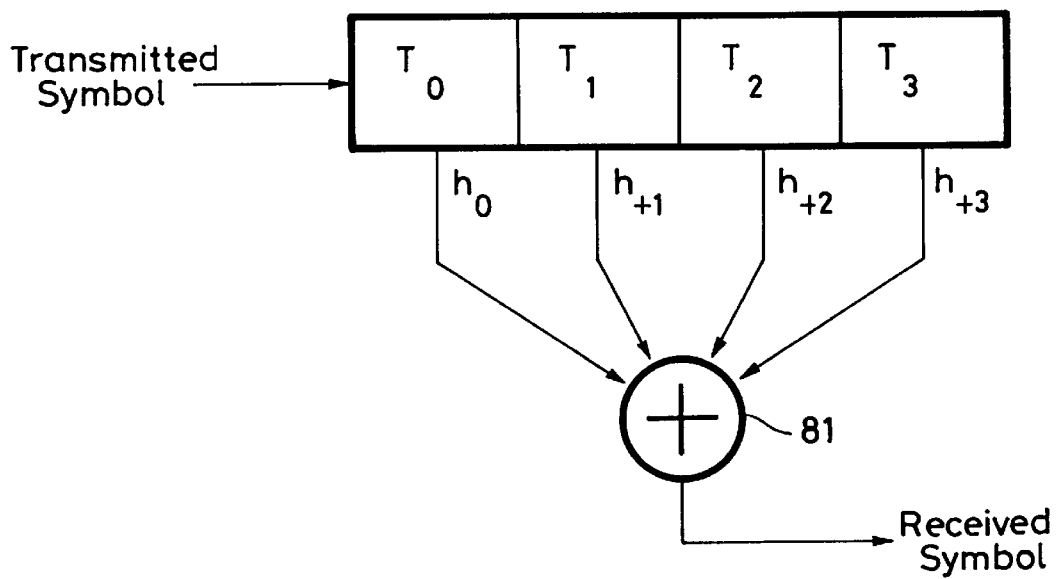
FIG. 10 is a diagram of a specific transmission path equivalent model.

The model shown in FIG. 10 can be regarded as a convolutional encoder having the following constraint length and rate:

Constraint length k=4, and
Rate r=1/1.

This convolutional encoder differs from an ordinary convolutional encoder in that an adder 81 operates linearly, symbols inputted to shift registers $T_0$, $T_1$, $T_2$, $T_3$ are of a binary value of <0> or <1>, and output signals from the shift registers are added to the adder 81 after being weighted by values corresponding to channel responses.

Symbols G which are delivered out from the model shown in FIG. 10 are expressed according to the following equation:

$$G = \sum_{n=0}^{+3} h_n \cdot \langle T_n \rangle \quad (11)$$

$$= h_0 \cdot <T_0> + h_{+1} \cdot <T_1> + h_{+2} \cdot <T_2> + h_{+3} \cdot <T_3>$$

$$= h_0 \cdot <T_0> + h_{+1} \cdot <T_1> + h_{+2} \cdot <T_2> + h_{+3} \cdot <T_3> \quad (11)$$

where $<T_j>$ represents the content stored in the shift register $T_j$.

Figure 11:
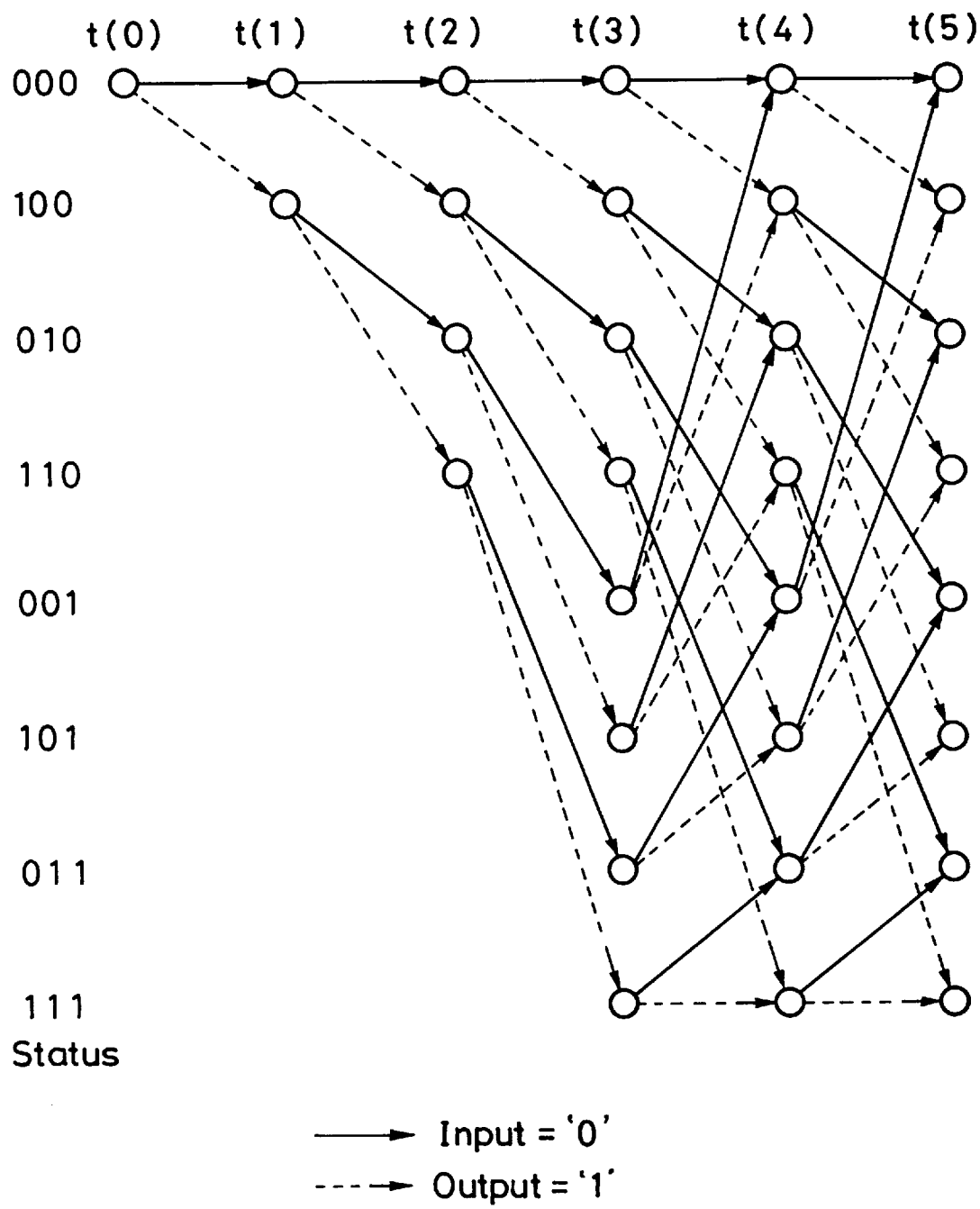
FIG. 11 is a diagram showing a trellis representation.

FIG. 11 is a trellis diagram showing transitions of the internal status of the transmission path of the transmission path model shown in FIG. 10. Three-figure numerals corresponding to respective status nodes $S_i$ represent the internal status of the shift registers $T_0$, $T_1$, $T_2$, $T_3$ in respective time slots. The trellis diagram is a modification of an ordinary grid structure diagram, and indicates transitions by the solid lines when an information input symbol <0> is inputted and as broken lines when an information input symbol <1> is inputted.

As shown in FIG. 2, reproduced signal data $Y_k$ are inputted to the branch metric calculating circuit 21, which calculates the likelihood relative to transitions. While several measures have been proposed to determine the likelihood, the Hamming distance which is the most general evaluative criterion in Viterbi decoders is applied in a wide sense.

A branch metric in a time slot t(k) is calculated as follows:

$$b(k, S_i \rightarrow S_n) = |Y_k - G_k|$$

where $Y_k$ represents received digital data, and $G_k$ the symbol transmitted from the equivalent transmission path model and taking a value calculated according to the equation (11).

A branch metric produced by the branch metric calculating circuit 21 is supplied to an ACS (Add Compare Select) circuit 22. The ACS circuit 22 is composed of an adder, a comparator, and a selector, and adds the branch metric and a path metric in a preceding time slot which is stored in a path metric memory 23, and selects a metric of a smaller value as a likely surviving path. A path metric is of a value representing the sum of branch metrics in a surviving path.

An output signal from the ACS circuit 22 is supplied through a normalizing circuit 24 to the path metric memory 23, and also supplied to a maximum-likelihood path detector 25.

The maximum-likelihood path detector 25 detects a path having a minimum path metric value, and outputs the content of a path memory 26 corresponding to the detected path as decoded data. The path memory 26 is a memory for estimating and storing information bit series.

Figure 12:
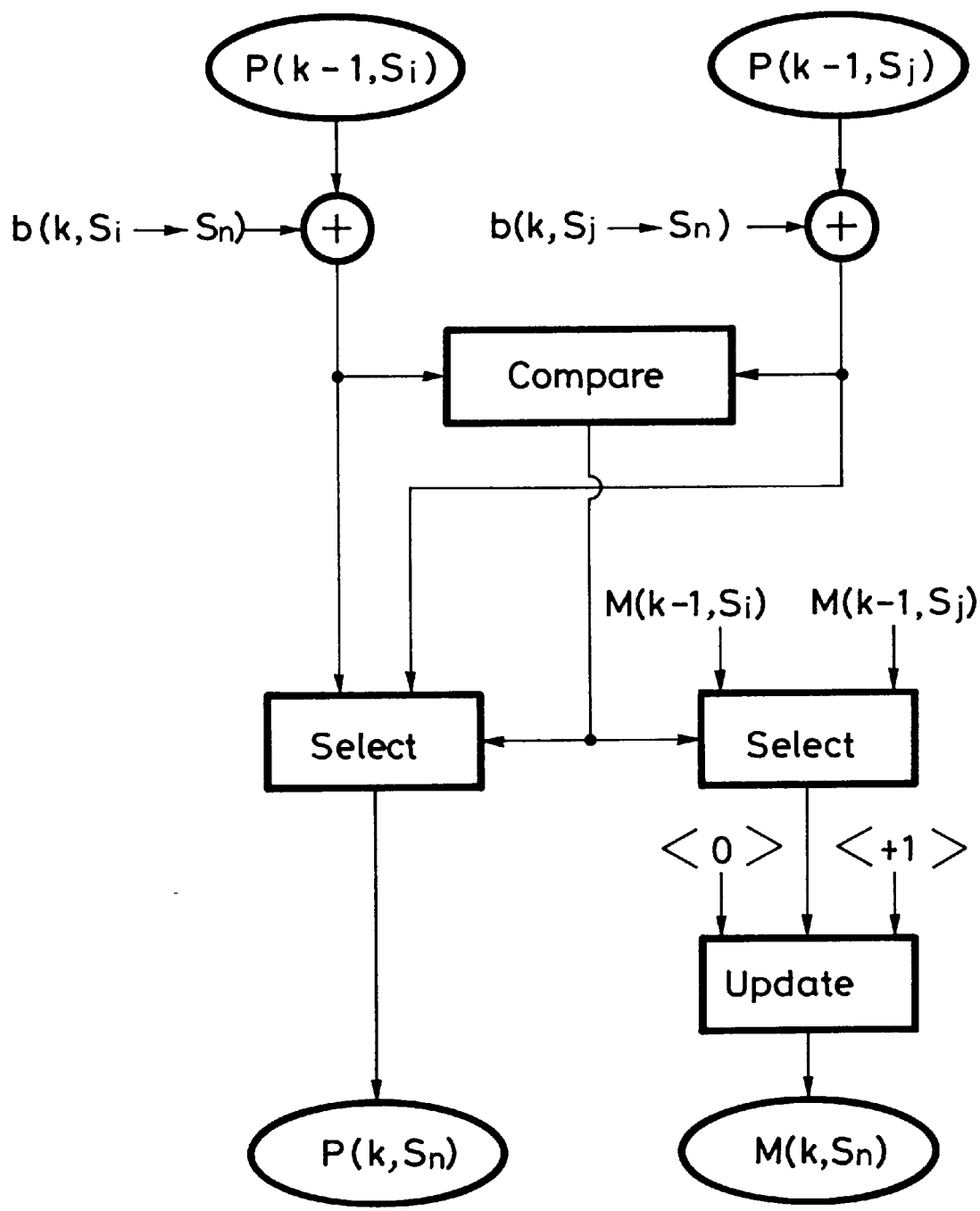
FIG. 12 a diagram showing a logic unit of a Viterbi equalizer.

A logic unit which constitutes the Viterbi equalizer is shown in FIG. 12. In FIG. 12, measures represent the following contents:

P(k−1, $S_i$): a path metric possessed by a surviving path which has reached a status node $S_i$ in a time slot t(k−1);

P(k−1, $S_j$): a path metric possessed by a surviving path which has reached a status node $S_j$ in a time slot t(k−1);

b(k, $S_i \rightarrow S_n$): a branch metric corresponding to transition from a status node $S_i$ to a status node $S_n$ in a time slot t(k);

b(k, $S_j \rightarrow S_n$): a branch metric corresponding to transition from a status node $S_j$ to a status node $S_n$ in a time slot t(k);

M(k−1, $S_i$): a path memory possessed by a surviving path which has reached a status node $S_i$ in a time slot t(k−1);

M(k−1, $S_j$): a path memory possessed by a surviving path which has reached a status node $S_j$ in a time slot t(k−1);

<−0>, <+1>: a information symbol estimated to be delivered out in a time slot t(k):

P(k, $S_n$): a path metric possessed by a surviving path which has reached a status node $S_n$ in a time slot t(k); and M(k, $S_n$): a path memory possessed by a surviving path which has reached a status node $S_n$ in a time slot t(k).

If the constraint length is k, then since the number of statuses is $2^{k-1}$, the number of logic units shown in FIG. 12 is basically required to be $2^{k-1}$.

It is customary to reduce the scale of the path metric memory 23 and prevent an overflow in calculating path metrics by providing the normalizing circuit 24 as shown in FIG. 2.

The normalizing circuit 24 specifically operates as follows: First, it detects a minimum value of path metric and then the detected minimum value is subtracted from each path metric quantity. There are $2^{k-1}$ surviving paths thus selected which are as many as the number of statuses.

Figure 13:
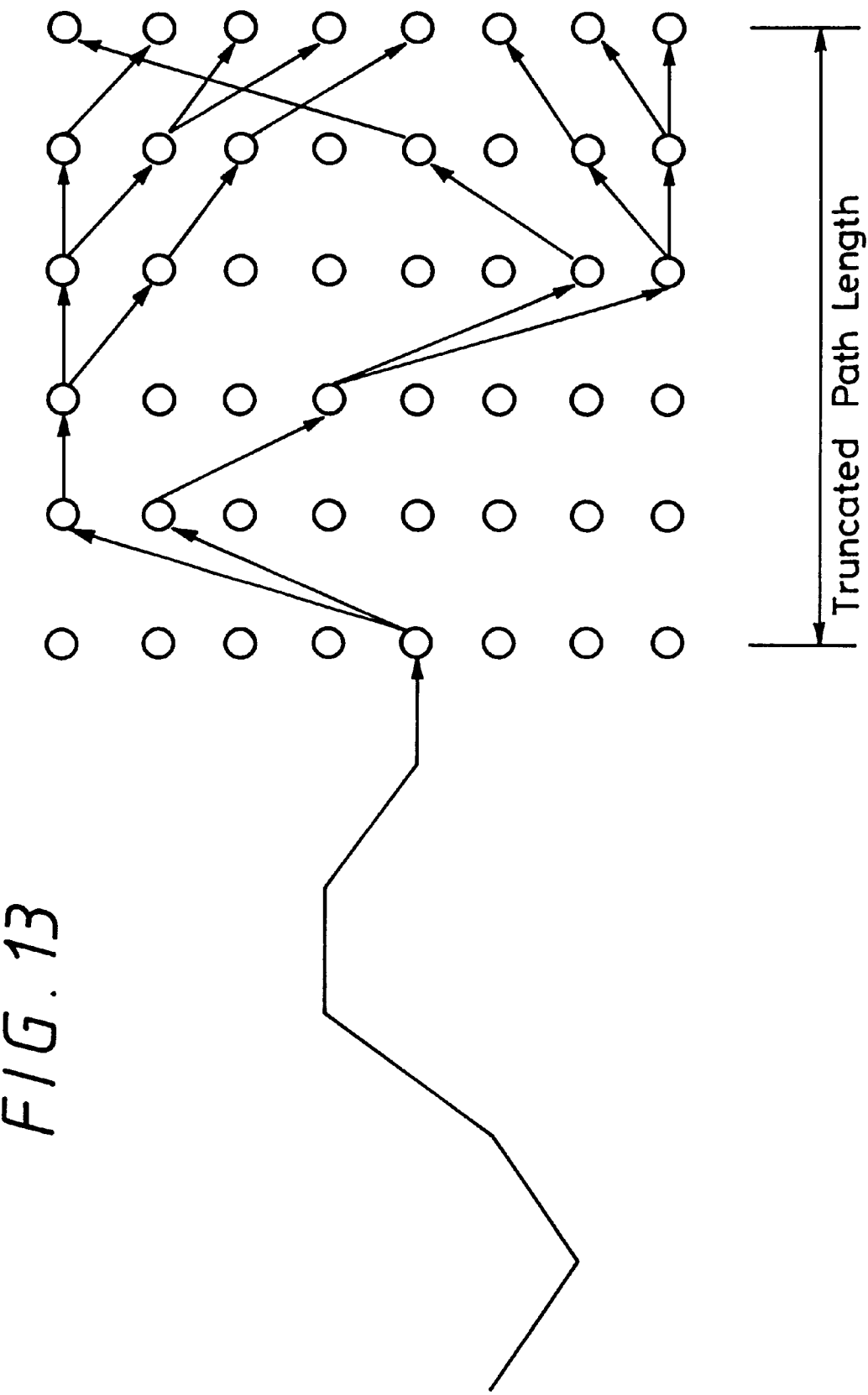
FIG. 13 is a diagram showing metric calculations and surviving paths.

In each time slot, the process of selecting a surviving path and the process of updating a path metric corresponding to the surviving path and the path memory 26 are repeated. It is known that if the above processes are carried out for a sufficiently long period of time, the paths merge into the same path prior to a certain point of time as shown in FIG. 13. The length of paths from the latest processing time until the paths merge is called a truncated path length.

In determining the maximum likelihood, a path having a minimum path metric value is detected, and the content of the path memory corresponding to the detected path is outputted as an information symbol at the time retrospected for a truncated path length (which is usually set to about 3 or 4 times the constraint length).

Figure 14:
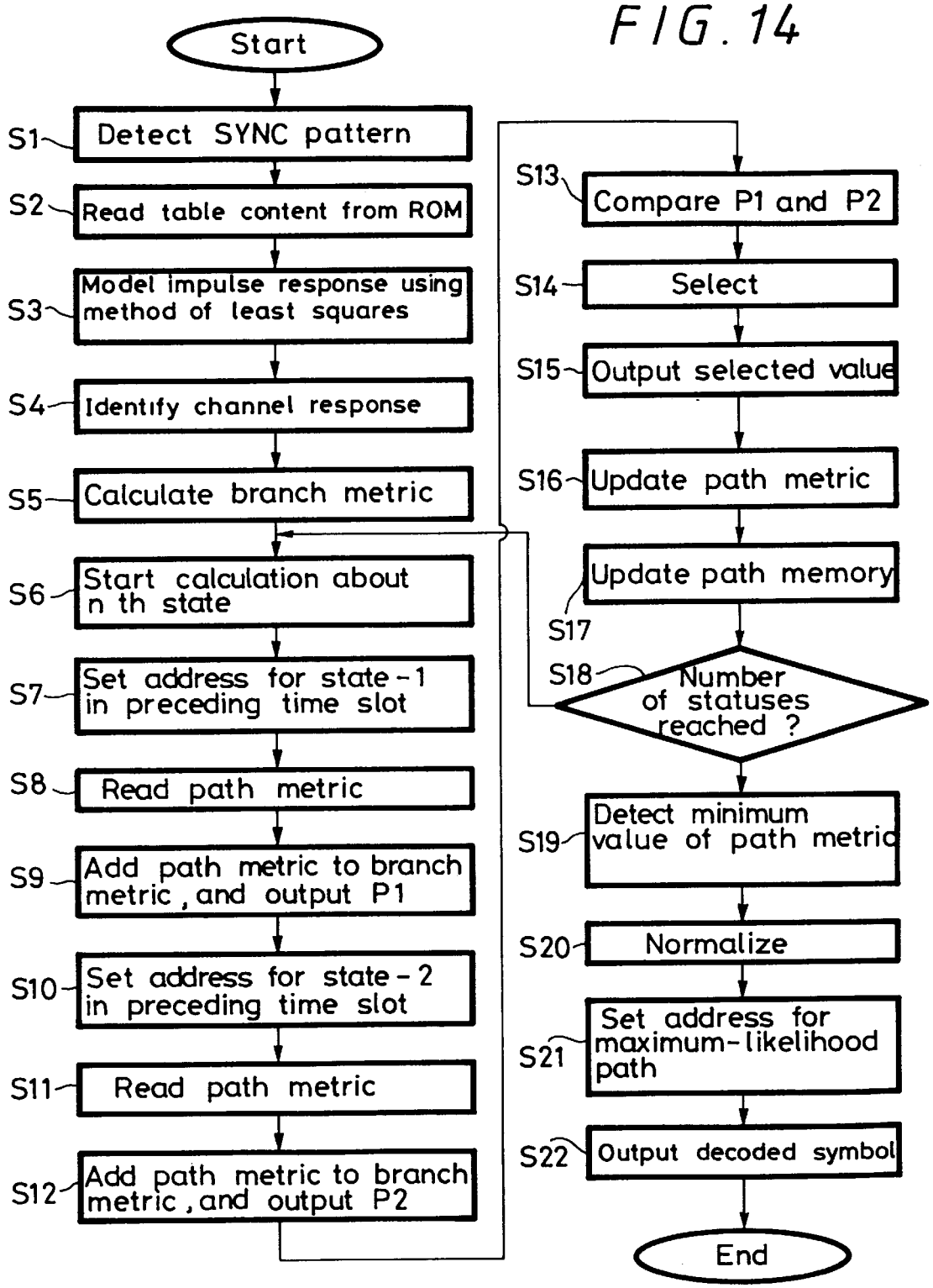
FIG. 14 is a flowchart of an operation sequence of the Viterbi equalizer.

Operation of the Viterbi equalizer will be described below with reference to FIG. 14.

When reproduced signal data $Y_k$ are supplied to the input terminal 9a, a synchronizing signal pattern part is detected by correlating the reproduced signal data $Y_k$ with stored synchronizing signal patterns in a step S1.

Then, a certain coefficient matrix is read from the ROM 4a in the transmission path characteristic estimator 4 in a step S2. With the detected synchronizing signal pattern part serving as a reference signal, the impulse response between the recording and reproducing systems is modeled using the method of least squares in a step S3. Then, a channel response is identified in a step S4.

Since the coefficient matrix which has been calculated and stored in the ROM 4*a* is employed for calculating the equation (8), the calculation of the equation (8) is actually unnecessary. Therefore, the channel response can be identified quickly.

Then, the branch metric calculating circuit 21 calculates a branch metric in a step S5, and starts calculations with respect to an Nth state in a step S6. Thereafter, the branch metric calculating circuit 21 sets an address for a state−1 in a preceding time slot in a step S7, and reads a path metric stored in the path metric memory 23 from the set address in a step S8. The read path metric is added to the branch metric calculated in the step S5 by the ACS circuit 22, and the sum output signal is stored in a register P1 in a step S9.

In a next step S10, the branch metric calculating circuit 21 sets an address for a state−2 in the preceding time slot. The branch metric calculating circuit 21 reads a path metric stored in the path metric memory 23 from the set address in a step S11. The read path metric is added to the branch metric calculated in the step S5 by the ACS circuit 22, and the sum output signal is stored in a register P2 in a step S12.

The ACS circuit 22 compares and selects the values stored in the respective registers P1, P2 in steps S13, S14, and outputs the selected value in a step S15. The path metric memory 23 is then updated with the selected value in a step S16, and the path memory 26 is also updated with the selected value in a step S17. The loop from the step S6 to the step S17 is repeated by the number of statuses, i.e., $2^{k-1}$ times, in a step S18.

Thereafter, the maximum-likelihood path detector 25 detects a path having a minimum path metric value in a step S19, and normalizes the path metric by subtracting the minimum value of path metric from each path metric quantity in a step S20.

Then, the maximum-likelihood path detector 25 sets the address of a maximum-likelihood path in a step S21, and the content of the path memory 26 is outputted as decoded data in a step S22.

With the above arrangement, as described above, to play back the magnetic recording medium 2 on which digital data have been recorded through the partial response encoder 1, the Viterbi equalizer is used as the partial response decoder, and the recorded signal data are decoded based on the maximum-likelihood series estimation. Therefore, the digital data can be reproduced well.

Furthermore, since the impulse response between the recording and reproducing systems is modeled using the method of least squares with the detected synchronizing signal pattern part serving as a reference signal, the impulse response between the recording and reproducing systems can uniquely be modeled.

Because the transmission model is estimated using the methods of least squares, the model suffers a minimum error, and provides good equalizing characteristics.

Moreover, the ROM 4*a* stores coefficient matrices which have been calculated in advance, and when the transmission path characteristic estimator 4 effects calculations using the method of least squares, it uses a coefficient matrix stored in the ROM 4*a*. Consequently, the number of calculating steps may be reduced, resulting in operation at a higher speed.

In the above embodiment, the coefficient matrices are stored as a table in the ROM 4*a*. However, since it is general practice to subject the coefficient matrices to L.U resolution in solving the simultaneous equations (8), the data stored in the ROM 4*a* may be of values produced after the coefficient matrices have been subjected to L.U resolution.

With such a modification, the number of calculating steps may further be reduced, resulting in operation at a much higher speed.

Generally, when a certain matrix and an inverse matrix thereof are multiplied, a unit matrix is produced. Inasmuch as the equations (8) can solved by using inverse and unit matrices of the coefficient matrices, the data stored in the ROM 4*a* may be inverse matrices of the coefficient matrices.

As the coefficient matrices are uniquely be determined as described above, their inverse matrices may also be determined in advance. For example, an inverse matrix of the coefficient matrix according to the equation (9) is given as follows:

$$\begin{bmatrix} .417683 \times 10^0 & .396342 \times 10^{-1} & -.207317 \times 10^0 & -.112805 \times 10^0 \\ .396342 \times 10^{-1} & .295732 \times 10^0 & -.853659 \times 10^{-1} & -.149390 \times 10^0 \\ -.207317 \times 10^0 & -.853659 \times 10^{-1} & .292682 \times 10^0 & .121951 \times 10^{-1} \\ -.112805 \times 10^0 & -.149390 \times 10^0 & .121951 \times 10^{-1} & .271342 \times 10^0 \end{bmatrix}. \quad (13)$$

According to the present invention, as described above, to play back the magnetic recording medium on which digital data have been recorded through the partial response encoder, the Viterbi equalizer is used as the partial response decoder, and the recorded signal data are decoded based on the maximum-likelihood series estimation. Therefore, the digital data can be reproduced well.

Furthermore, since the impulse response between the recording and reproducing systems is modeled using the method of least squares with the detected synchronizing signal pattern part serving as a reference signal, the impulse response between the recording and reproducing systems can uniquely be modeled. The model thus determined suffers a minimum error in the sense of estimation based on the method of least squares, resulting in good equalizing characteristics. The ROM 4*a* stores coefficient matrices which have been calculated in advance, values produced when the coefficient matrices are subjected to L.U resolution, or inverse matrices of those coefficient matrices. When the transmission path characteristic estimator 4 effects calculations using the method of least squares, it uses a coefficient matrix, a value produced when the coefficient matrix is subjected to L.U resolution, or an inverse matrix thereof, which are stored in the ROM 4a. Consequently, the number of calculating steps may be reduced, resulting in operation at a higher speed.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A magnetic reproducing apparatus for playing back a magnetic recording medium on which digital data have been magnetically recorded through a partial response encoder, comprising:

a recording system for reproducing said digital data from said magnetic recording medium;

synchronizing signal data detecting means for receiving said digital data from said reproducing system and for detecting a synchronizing signal data part from a reproduced signal data series which has been encoded by said partial response encoder;

transmission path characteristics estimating means for modeling an impulse response between a recording system and said reproducing system based on the synchronizing signal data part encoded by said partial response encoder and detected by said synchronizing signal data detecting means, said synchronizing signal data part being used as a reference signal by said transmission path characteristics estimating means; and decoding means for decoding said reproduced signal data series according to a Viterbi algorithm based on a transmission model produced by said transmission path characteristics estimating means.

2. A magnetic reproducing apparatus according to claim 1, wherein said transmission path characteristics estimating means comprises means for modeling the impulse response between the recording system and the reproducing system using the method of least squares with the synchronizing signal data part used as the reference signal, and a ROM for storing coefficient matrices to be used in the method of least squares.

3. The magnetic reproducing apparatus according to claim 2, wherein said ROM stores a plurality of sets of coefficient matrices with said plurality of sets of coefficient matrices corresponding to a respective plurality of channel responses.

4. The magnetic reproducing apparatus according to claim 1, wherein said transmission path characteristics estimating means comprises means for modeling the impulse response between the recording system and the reproducing system using the method of least squares with the synchronizing signal data part used as the reference signal and a ROM for storing inverse matrices of coefficient matrices to be used in the method of least squares.

5. The magnetic reproducing apparatus according to claim 4, wherein said ROM stores a plurality of sets of inverse matrices with said plurality of sets of inverse matrices corresponding to a respective plurality of channel responses.

6. The magnetic reproducing apparatus according to claim 1, wherein said synchronizing signal data part has a constant signal pattern.

7. The magnetic reproducing apparatus according to claim 1, wherein said synchronizing signal data part comprises an M-series signal.

8. The magnetic reproducing apparatus according to claim 1, wherein said synchronizing signal data part is received before each block of data in said reproduced signal data series.

9. The magnetic reproducing apparatus according to claim 1, wherein said transmission path characteristics estimating means comprises a ROM storing a coefficient matrix and a calculating circuit for retrieving said coefficient matrix stored in ROM and for determining a channel response.

10. A magnetic reproducing apparatus for playing back a magnetic recording medium on which digital data have been magnetically recorded through a partial response encoder, comprising:

a recording system for reproducing said digital data from said magnetic recording medium;

synchronizing signal data detecting means for receiving said digital data from said reproducing system and for detecting a synchronizing signal data part from a reproduced signal data series which has been encoded by said partial response encoder;

transmission path characteristics estimating means for modeling an impulse response between a recording system and said reproducing system based on the synchronizing signal data part encoded by said partial response encoder and detected by said synchronizing signal data detecting means, said synchronizing signal data part being used as a reference signal by said transmission path characteristics estimating means; and decoding means for decoding said reproduced signal data series according to a Viterbi algorithm based on a transmission model produced by said transmission path characteristics estimating means;

said transmission path characteristics estimating means comprising means for modeling the impulse response between the recording system and the reproducing system using the method of least squares with the synchronizing signal data part used as the reference signal and a ROM for storing coefficient matrices to be used in the method of least squares;

wherein data stored in said ROM are values produced when the coefficient matrices are subjected to L.U resolution.

* * * * *